United States Patent
Urrabazo et al.

(10) Patent No.: US 9,866,915 B2
(45) Date of Patent: Jan. 9, 2018

(54) CONTEXT RELEVANT INTERACTIVE TELEVISION

(75) Inventors: Roger Urrabazo, Gilroy, CA (US); Dave Rice, Menlo Park, CA (US); John La, San Jose, CA (US); Todd R. Glidden, Dublin, CA (US); Vishwas Raman, Fremont, CA (US)

(73) Assignee: Excalibur IP, LLC, New York, NY (US)

( * ) Notice: Subject to any disclaimer, the term of this patent is extended or adjusted under 35 U.S.C. 154(b) by 372 days.

(21) Appl. No.: 13/475,910

(22) Filed: May 18, 2012

(65) Prior Publication Data
US 2013/0139209 A1 May 30, 2013

Related U.S. Application Data

(60) Provisional application No. 61/564,291, filed on Nov. 28, 2011.

(51) Int. Cl.
*H04N 21/278* (2011.01)
*H04N 21/422* (2011.01)
(Continued)

(52) U.S. Cl.
CPC ..... *H04N 21/4828* (2013.01); *H04N 21/4307* (2013.01); *H04N 21/4394* (2013.01)

(58) Field of Classification Search
CPC ........... H04N 21/278; H04N 21/44204; H04N 21/4622; H04N 21/472
(Continued)

(56) References Cited

U.S. PATENT DOCUMENTS 5,818,441 A * 10/1998 Throckmorton et al. ..... 715/717
5,991,799 A * 11/1999 Yen et al. ..................... 709/218
(Continued)

FOREIGN PATENT DOCUMENTS

EP           2085894 A1   8/2009
KR   10-2002-0056769 A   7/2002
(Continued)

OTHER PUBLICATIONS

International Search Report—PCT/US2012/066908 dated Feb. 28, 2013—3 pages.
(Continued)

*Primary Examiner* — Dominic D Saltarelli
(74) *Attorney, Agent, or Firm* — Martine Penilla Group, LLP (57) ABSTRACT

Methods, systems and computer readable medium with program instructions for providing contextually relevant information for multimedia content streaming through a rendering device, includes detecting a selection of the multimedia content for rendering on the rendering device. An audio signal of the multimedia content is retrieved and analyzed to generate an audio fingerprint. The generated audio fingerprint is used to identify the multimedia content that is selected for rendering. Contextually relevant content for a portion of the multimedia content being rendered on the rendering device is dynamically retrieved from one or more sources and mapped to data associated with the portion of the multimedia content. The mapping results in the rendering of the relevant content during the rendering of the portion of the multimedia content and provides additional information that is contextually relevant to the portion of the multimedia content that is currently being rendered on the rendering device.

17 Claims, 7 Drawing Sheets

(51) Int. Cl.
  *H04N 21/462* (2011.01)
  *H04N 21/472* (2011.01)
  *H04N 21/482* (2011.01)
  *H04N 21/43* (2011.01)
  *H04N 21/439* (2011.01)

(58) Field of Classification Search
  USPC .................................... 725/32–36, 18, 87
  See application file for complete search history.

(56) References Cited

U.S. PATENT DOCUMENTS

| | | | |
|---|---|---|---|
| 2002/0129364 | A1 | 9/2002 | Smith et al. |
| 2002/0157116 | A1* | 10/2002 | Jasinschi ..................... 725/136 |
| 2004/0172411 | A1* | 9/2004 | Herre et al. ............... 707/104.1 |
| 2008/0002021 | A1 | 1/2008 | Guo |
| 2008/0092164 | A1 | 4/2008 | Agarwal et al. |
| 2010/0269138 | A1* | 10/2010 | Krikorian et al. ............ 725/39 |
| 2011/0063503 | A1 | 3/2011 | Brand et al. |
| 2011/0208726 | A1 | 8/2011 | Shah |

FOREIGN PATENT DOCUMENTS

| | | | |
|---|---|---|---|
| KR | 10-2007-0097678 A | 10/2007 |
| WO | 2011032168 A1 | 3/2011 |

OTHER PUBLICATIONS

EP Supplementary Search Report EP12852496, dated May 20, 2015, 11 pages.

* cited by examiner

Figure 6

CONTEXT RELEVANT INTERACTIVE TELEVISION

CLAIM OF PRIORITY

This application claims priority to U.S. Provisional Patent Application No. 61/564,291, filed Nov. 28, 2011, entitled "CONTEXT RELEVANT INTERACTIVE TELEVISION," the disclosure of which is herein incorporated by reference.

BACKGROUND

Field of the Invention

The present invention relates to computer and television entertainment, and more particularly to applications that run on interactive television.

Description of the Related Art

Evolution of the television in recent years has resulted in the television systems becoming a display for a computer. The computer can be a standard computer, such as personal computer, a laptop, a set-top box, video player box, etc. A box, such as a set-top box, or other similar device is provided by a media provider for connecting to the television system so that users are able to access content provided by the media provider and/or download content over the Internet. Using these devices users are able to download and view contents from a wide variety of sources using the applications executing on the box.

Although the boxes and other similar devices provide access to the media on the internet, the amount and type of information accessible for multimedia content provided by content providers are still very limited and static. For instance, when a user watches a live show, such as Oscar ceremony, the user has to rely on commentators/critics to provide the information related to certain events that occur during the ceremony, such as information related to an actor nominated for best actor. Any additional information related to the Oscars ceremony for enriching the user's interactive experience, is not readily available. For instance, it would be wonderful to have additional information related to the particular actor that was nominated for best actor, such as information related to how many times the actor was nominated for the Oscars, how many times the actor won the Oscars, which years he was nominated and which years he won the Oscars, which movies he starred, etc. Such lack of relevant information is also felt with relation to multimedia content that are recorded on a box, such as a digital video recorder, and watched later. Some applications used for recording on a box, also provide additional information related to the multimedia content. However, the information related to the multimedia content are static and stale or are not synchronized with the multimedia content that is being rendered. This may be due to the fact that the information related to the multimedia content is maintained in a separate channel from the multimedia content data.

It is in this context that the embodiments of the invention arise.

SUMMARY

Embodiments of the present invention describe methods and systems for managing multimedia content and for providing event-based contextually relevant information pertaining to multimedia content selected for rendering on a rendering device, such as a television (TV) device. The embodiments manage data obtained from a plurality of sources so as to provide relevant information related to specific points of interest in multimedia content, thereby enabling a user to have an effective and efficient interactive TV viewing experience. The contextually relevant information are dynamically updated over time so that the users are presented with the most updated information during subsequent rendering of the multimedia content, further enriching a user's online experience.

In one embodiment, a method for providing contextually relevant information for multimedia content streaming through a rendering device, such as a television, is disclosed. The method includes detecting a selection of the multimedia content for rendering on the rendering device. An audio signal of the multimedia content is retrieved and analyzed to generate an audio fingerprint. The generated audio fingerprint is used to identify multimedia content that is selected for rendering on the rendering device. Contextually relevant content for a portion of the multimedia content being rendered on the rendering device, is dynamically retrieved from one or more sources and mapped to data associated with the corresponding portion of the multimedia content. The mapping results in defining a video offset that can be used to render the relevant content during the rendering of the portion of the multimedia content. The content provides additional information that is contextually relevant to the portion of the multimedia content that is currently being rendered on the rendering device.

In another embodiment, a method for managing data obtained from a plurality of sources to provide contextually relevant information for multimedia content streaming through a rendering device, is disclosed. The method includes detecting a selection of the multimedia content from a set of pre-recorded content for rendering on the rendering device. An audio signal of the multimedia content is retrieved and analyzed to generate an audio fingerprint. The audio fingerprint is used to identify the multimedia content selected for rendering. Contextually relevant content received from a plurality of sources and mapped to a portion of the multimedia content currently being rendered on the rendering device, is retrieved from a content repository. The relevant content is rendered during the rendering of the multimedia content. The relevant content provides additional contextually relevant information for the portion of the multimedia content that is being rendered on the rendering device.

In yet another embodiment, a system for managing data obtained from a plurality of sources is disclosed. The system includes a media server having a media identification logic module, a schedule module, an events trigger module and a data presentation module. The system also includes communication interface to interact with a plurality of sources which provide data to the media server and with a plurality of rendering devices for rendering the multimedia content over the Internet. The media identification logic module is configured with logic and program code to interact with the schedule module to identify which multimedia show is selected for watching at each rendering device that is receiving services from the media sources. The media server interacts with one or more media sources to obtain data associated with particular events in the multimedia content and render the data dynamically with the multimedia content to the user. An events trigger module identifies the various event triggers for different multimedia content based on the context that would indicate to the media server when to dynamically obtain relevant information that are contextually related to a portion of the multimedia content being rendered. The data presentation module is configured to present the relevant information along with the multimedia content at the rendering device.

The embodiments of the invention provide an algorithm that can be executed by a processor of a computer system to identify multimedia content and information related to the multimedia content selected for rendering at the rendering devices. The information is additional information that is contextually related to the multimedia content that is being viewed on the rendering device, thereby enriching the user's viewing experience. The additional information is provided on the rendering device alongside the multimedia content that the user is currently watching.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Broadly speaking, the embodiments of the present invention provide methods, systems and computer algorithm within a non-transitory computer readable medium for managing data from a plurality of sources and to provide contextually relevant information for multimedia content streaming through or to a rendering device. In one embodiment, an algorithm processed, at least in part at a media server, is used to interact with a rendering device so as to identify multimedia content selected for rendering on the rendering device. The algorithm obtains audio signal of the multimedia content being rendered and generates an audio fingerprint for the audio signal. The generated audio fingerprint is used to identify the specific multimedia content being rendered. The algorithm then communicates with the plurality of sources to obtain additional content that is contextually relevant to particular events occurring within the identified multimedia content. The additional content is presented to the user in a dynamic manner as events get triggered while the user is watching the multimedia content, greatly enhancing the user's viewing experience. The additional content provides information, such as statistics and time relevant data, relating to specific points of interest in the presented multimedia content.

Figure 1:
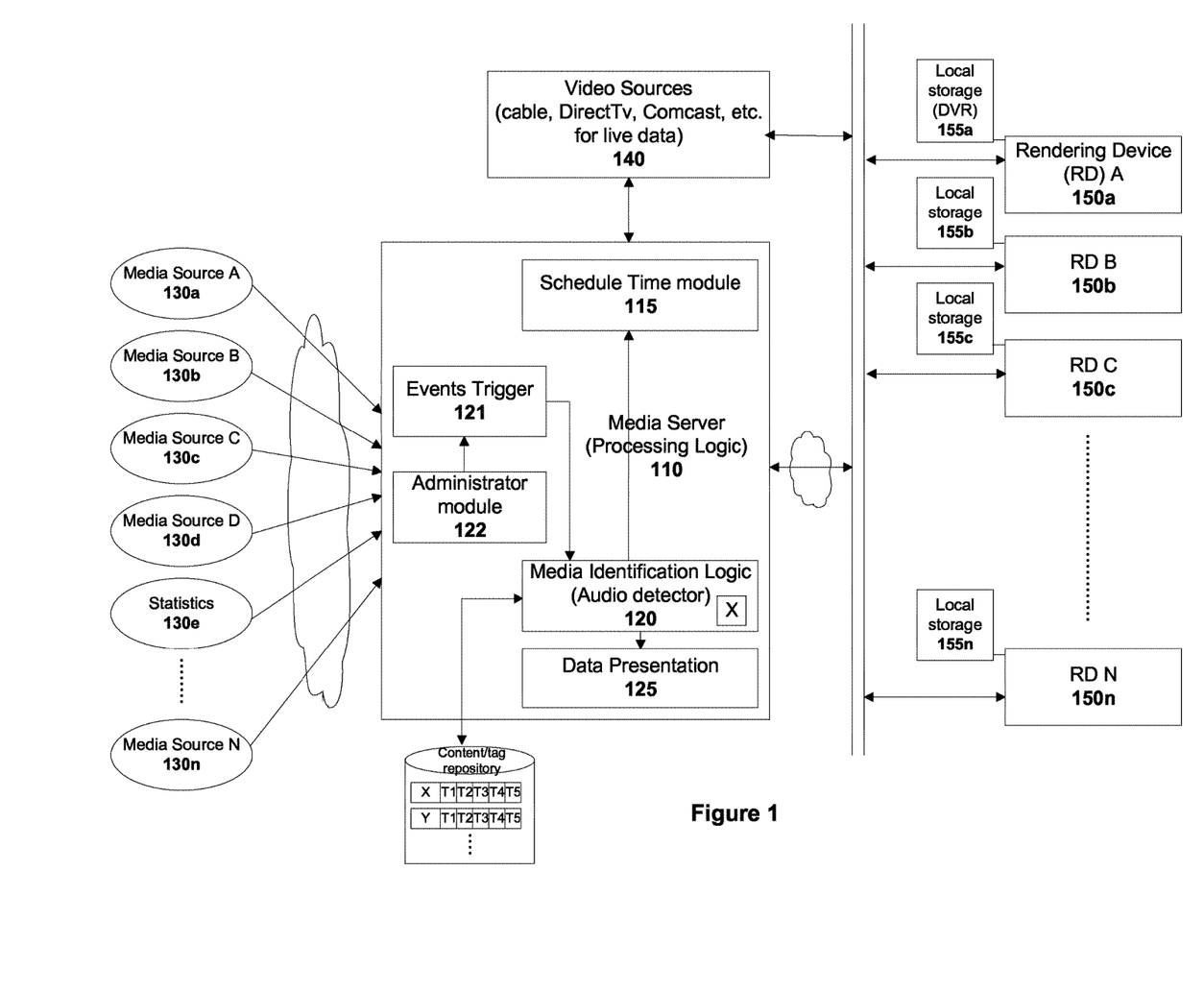
FIG. 1 illustrates a simplified block diagram of a system used for managing data obtained from a plurality of sources and to provide contextually relevant information for multimedia content streaming through a television, in one embodiment of the invention.

With a brief understanding of the invention, various embodiments of the invention will now be discussed with reference to the drawings. FIG. 1 illustrates a broad level diagram of a system used for managing data obtained from a plurality of sources in order to identify specific points of interest in the multimedia content and to provide contextually relevant information for the specific points of interest in a multimedia content streaming through a rendering device. The system includes a media server 110. The media server is equipped with interface and processing logic to interact with a plurality of sources to obtain data related to multimedia content, to analyze the data to identify the multimedia content and to obtain relevant data related to the multimedia content. The media server 110 includes a media identification logic 120, schedule time module (or simply a schedule module) 115, an events trigger module 121 and a data presentation module 125. As indicated, the media server is in communication with a plurality of sources 130, which provide data to the media server over the Internet. The plurality of sources 130 can provide various types of data, such as multimedia content, statistics and time relevant data associated with a particular multimedia content selected for viewing by a particular user. The media server is interfaced with a plurality of rendering devices 150 over a communication interface available over the Internet. The rendering devices 150, in one embodiment, are associated with devices that are utilized by users for viewing particular multimedia content, such as video data. The rendering device, in some embodiments, can be in the form of a television unit that comes integrated with processing circuitry to allow users to access multimedia content and other data over the Internet. The television units may include local storage for saving at least part of or all of the multimedia content selected by the user. The multimedia content, in one embodiment, may be broadcast television shows, sporting events, and other audio-video (A/V) content. The A/V content can be live streaming data, or can be data that is obtained from storage.

The A/V content data obtained from storage can be multimedia content data previously recorded by a user and stored in a local storage, or recorded and made available by a content provider. For example, the A/V content data can be previously aired television shows, sporting events, news shows, interviews, reality shows, or any other type of multimedia content presentation. In one embodiment, when the A/V content data includes content previously recorded by a user, the content data is stored in a storage 155 that is local to the rendering device 150. In one embodiment, the local storage can be in the form of a digital video recorder (DVR). In alternative embodiments, the local storage is either native to the rendering device 150 or is an external storage device associated with the rendering device 150. The local storage 155 is coupled to the rendering devices 150. In another embodiment, when the A/V content data includes content previously recorded by a content provider, the rendering devices may be part of a cloud computing system with access to data from various media sources over the Internet. In this embodiment, the A/V content data accessed by each rendering device may be part of cloud computing storage.

Still referring to FIG. 1, the media server 110 is coupled to the Internet and provides access to the rendering devices 150 over the Internet. The rendering devices 150 include operating logic and application program that interacts with code executing at the media server 110 so as to allow communication between the rendering devices and the media server 110. For example, the code may be part of a program associated with the media server 110 that allows the media server 110 to provide programming data, facts, and additional augmentation data to the rendering devices 150 at particular times, based on the content being viewed by the user of the rendering devices 150. The rendering devices 150 may be coupled to the Internet using a wired connection or wireless connection. In one embodiment, the rendering device 150 is able to communicate with the media server 110 upon user authentication. In this embodiment, the user associated with the rendering device 150, such as 150a, has an account with the media server 110 and access to the media server 110 is through an user authentication interface provided at the rendering device 150 of the user. Upon user authentication, the media server 110 will execute code to identify a particular multimedia content selected and currently being viewed by the specific user of the rendering device 150a.

In one embodiment, a media identification logic module 120 is engaged by the media server 110 to identify a particular show or multimedia content selected for rendering at each rendering device 150 that is receiving services from the media server 110. The media identification logic module 120 is configured with logic and program code to identify the particular show by retrieving audio signal of the particular show selected for rendering at the specific rendering device and analyzing the audio signal to generate an audio fingerprint. The audio fingerprint is used to find a match of the show selected for rendering at the rendering device 150. Based on a time that the user has selected to view the show at the rendering device or based on the show identified for viewing from a previously recorded show, the media identification logic module 120 can sample the audio data being played at the rendering device 150, and can then identify the specific show being watched.

The media identification logic module receives an audio signal for the show from a source, such as media source 130 or video source 140, and partitions the audio signal into a plurality of segments of small intervals. A particular segment is selected and analyzed to identify acoustic modulations in the particular segment. The analysis generates a distinct vector for the particular segment based on the acoustic modulation. In one embodiment, the vector is a 234 data point vector that substantially defines the acoustic modulation. A content database available to the media server is queried to obtain content information of a particular content whose vector matches the vector of data points of the particular segment. The content information provides identification information for the multimedia content that is selected for rendering. For more information related to generating of fingerprint and matching of the fingerprint using acoustic modulation, reference can be made to application Ser. No. 13/332,331, filed on Dec. 21, 2011, and entitled, "Audio Fingerprint for Content Identification," which is incorporated herein by reference.

If the show being watched is a live show, the media identification logic module 120 interacts with the schedule module 115 to identify the particular show. The schedule module 115, at any given time, is able to access the Internet and obtain programming schedules being aired at a specific location associated with the user, to obtain a short list defining a subset of shows or programs that are scheduled for the specific location during the time frame the particular show is selected for viewing by the user. The programming schedules may be obtained from a plurality of sources, such as media sources 130 or video sources 140, or it can be obtained from a single media source that performs the consolidation of all the shows by interacting with media/video sources. The media identification logic module 120 communicates with the schedule module 115 to obtain the subset of shows scheduled for the time frame selected by the user for analysis and comparing against the audio fingerprint in order to find a match. Once the multimedia content is identified by the media identification logic module 120, the media server maintains communication with the plurality of sources 130, so as to gather data associated with particular events in the show (i.e. program) being watched and to present the same to the user in a dynamic manner. For example, if the user has selected a sporting event for viewing, there are specific events within the sporting event that occur in a live context during the course of play. Information related to the specific events can be gathered from the Internet and presented to the user during the occurrence of such events during the course of play of the sporting event. In one embodiment, if the sporting event has particular events that can be associated with particular facts, then the particular facts can be looked up on the Internet by the media server 110 by accessing one or more of the media sources 130 in substantial real time. In one embodiment, in addition to the static web content, the information related to the specific event gathered from the Internet include user generated information. The user generated information, in one embodiment, may include pictures/photos taken at the sporting event by one or more users.

Once the data for the particular facts are gathered from the media sources 130, data related to specific facts or information that is contextually relevant to a particular event in the sporting event can be presented to the user as and when the particular event is encountered, while the user is viewing the sporting event on the rendering device 150. The media identification logic module 120 may provide an option on the rendering device, such as a signal or an icon, to indicate that additional pertinent facts and/or information are available for viewing for the particular event. When the user selects the signal/icon, the contextually relevant data related to the particular event occurring in the sporting event is rendered on the rendering device for the user to view.

To identify various events that might occur within a particular show, the media server is equipped with an events trigger module 121. The events trigger module 121 can be programmed by an administrator of the media server 110 to identify trigger events for the various shows that are scheduled or selected for rendering at the rendering devices. In one embodiment, one or more administrators can program event triggers for different types of shows, sporting events, etc. For instance, for a sporting event, the administrator may identify specific events for which to obtain facts and/or additional information for presenting to the user and generate event triggers. For example, if the sporting event is a football game, then the administrator using an administrator module 122 can program trigger events to include such events as touchdown, red zone activity, throwing of a flag by a referee, or any other events that the administrator may deem appropriate to receive/provide additional information.

Generally, a red zone activity in a football game is associated with actions that are occurring within the last 20 yards before the team approaches a touchdown marker. For example, if a particular team is approaching a touchdown marker and enters the red zone, the media server 110 can look up specific facts from the various media sources 130 associated with that team's prior activities in the red zone. In specific examples, the media server can access statistical data showing how many times that particular team has scored in the last year when they entered the red zone, how many touchdowns they have scored after entering the red zone, how many times they fumbled the football when entering the red zone, etc.

Thus, the administrator of the media server 110, using the administrator module 122, can program any number of event triggers 121 for a particular show/event that indicates to the media server 110 when to obtain relevant facts that are contextually related to currently occurring activity in the video or show/event being watched. In one embodiment, if the user is viewing a sporting event, such as a football game, certain media sources 130 could be tracking the current progress of a team when they march the football down the field. This progress data can be obtained by querying the respective one or more media sources 130 for current status. Based on this information, the media server 110 can access other media sources 130 to obtain statistics data for particular events, times, or circumstances that are occurring in the football game. For instance, using the football game from the above example, one or more media sources may provide relevant statistics when a particular team approaches the red zone, such as how many times the particular team that has ownership of the ball had approached the red zone previously, how many times the team has scored, how many times the team had touchdowns, etc. The algorithm within the media server is able to track the progress of the game by determining exact context of the game at specific times, such as what yard the team with the ball is down to, at what time, how many chances the team has for scoring a touchdown, and other general types of statistics that are provided by media sources and rendered on the screen during live play. In addition, the algorithm is able to analyze previous plays in the game for the team with the ownership of the ball that got the team to a current position of game play. Equipped with this contextual information and based on event triggers provided by an administrator, the algorithm may provide video offset when the team approaches the red zone. The video offset is identified by a tag at the specific time of the game play/show. The media server then queries the media sources for updated statistics that is relevant to the event trigger. As noted above, this information is obtained when the events trigger module 121 identifies the red zone approach by a team as a trigger event, which indicates that additional information data should be obtained and presented to the user at the corresponding rendering device 150.

In one embodiment, the data could be obtained by dynamically querying the media sources 130 and consolidating the information received from different media sources 130. In one embodiment, the events trigger module 121 may also provide media wrapper and user interface information related to each trigger event to the media server so that additional information may be organized to comply with the media wrapper requirements. The additional information is tagged to the video offset specified for the trigger event with a specific time period related to game play and saved as tag data in a storage device available to the media server for future rendering. The organized additional information is presented by the media server 110 at the display device associated with the rendering device 150 for the trigger event, while the user is viewing the game.

Figure 2:
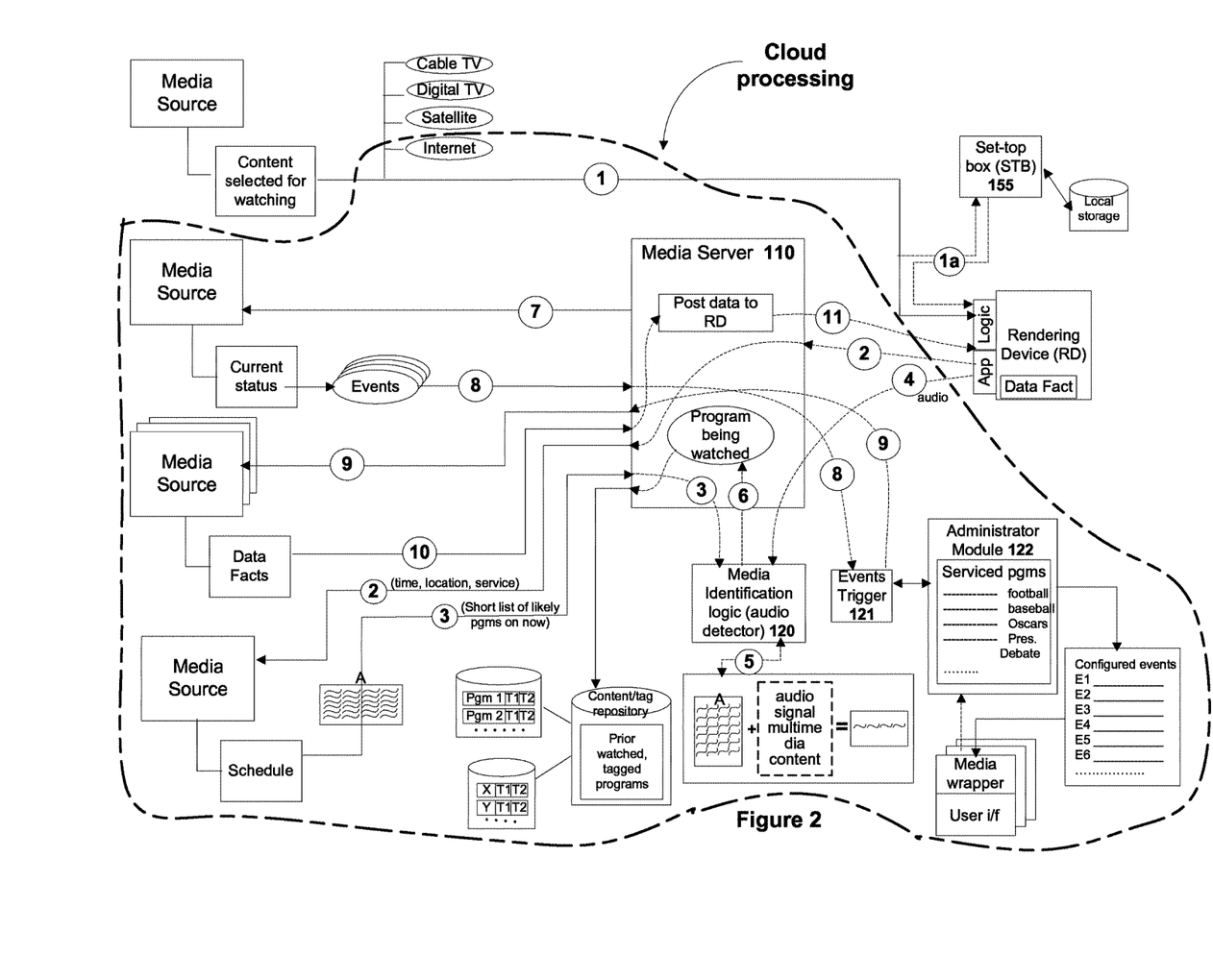
FIG. 2 illustrates an exemplary process flow of data across various modules in order to provide contextually relevant information for multimedia content streaming through a television, in one embodiment.

FIG. 2 illustrates process flow of data through an exemplary system equipped with an application algorithm that is used to provide contextually relevant data for multimedia content on a rendering device. The process flow of data begins when a user requests multimedia content for viewing, from a media source. The request may be made directly from a rendering device or through an auxiliary device, such as a remote control, that is associated with the rendering device. The requested multimedia content can be provided by any one of the media sources, such as cable television (TV), digital TV, satellite TV, the Internet, etc. Consequently, in response to the request from the user, appropriate media source is identified, appropriate multimedia content is selected and the selected multimedia content is forwarded to the rendering device for rendering, as shown by bubble 1.

In one embodiment, the logic for accessing and requesting multimedia content from various media sources and an application to obtain additional contextually relevant information for the selected multimedia content is available on a rendering device and the multimedia content returned by the media source is rendered on the rendering device in real-time. In an alternate embodiment of the invention, the request for multimedia content is received through a set-top box (STB), such as DVR, and the multimedia content is forwarded to the set top box, as illustrated by bubble 1a.

Figure 2A:
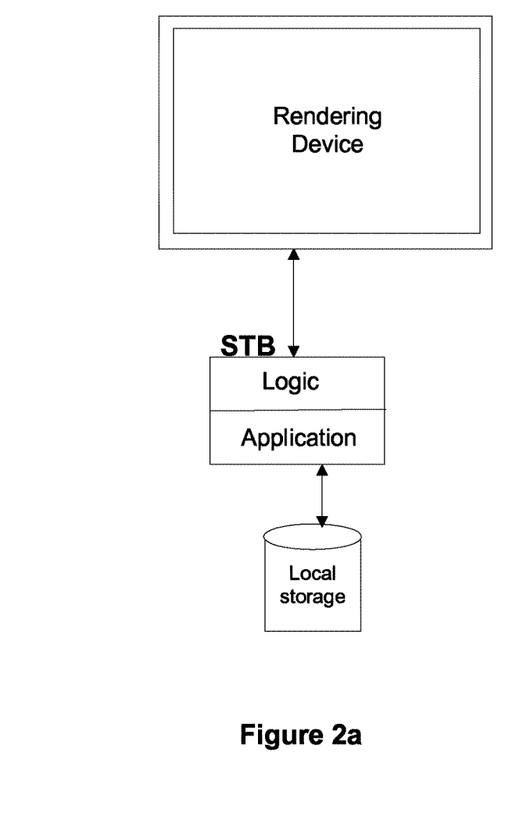
FIGS. 2a-2c illustrate exemplary devices for receiving and rendering multimedia content, in alternate embodiments.
Figure 2B:
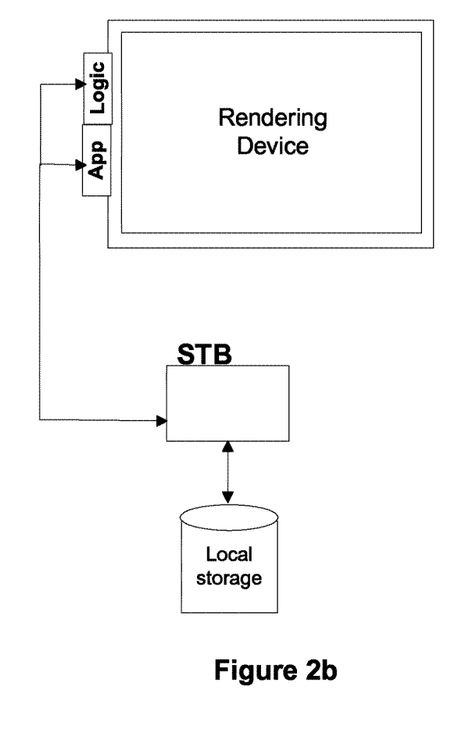
Figure 2C:
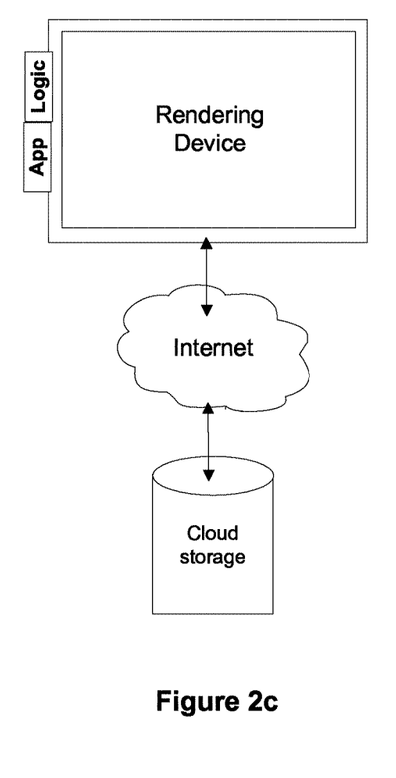

In one embodiment, the STB is communicatively coupled to the rendering device (RD) and includes the logic and the application for requesting and receiving multimedia content and additional contextually relevant information for rendering at the rendering device and storing the multimedia content and additional information within the STB or in an external storage that is available locally, as illustrated in FIG. 2a. In an alternate embodiment, the logic and the application may be available at the RD while the multimedia content may be stored in the STB or in a storage device external to the STB, as illustrated in FIG. 2b. The STB may have sufficient memory to receive and store the multimedia content for later viewing by a user. Alternately, the rendering device may include the application and logic for receiving the multimedia content and additional information from one or more media source and storing them in a cloud-storage available to the rendering device over the Internet, as illustrated in FIG. 2c. In this embodiment, the rendering device is part of a cloud computing system.

It should be noted herein that the multimedia content may be stored in its entirety at the rendering device, at the STB, at the local storage available to the STB or the rendering device. Alternately, the multimedia content may be stored in the cloud-storage and only a pointer to the multimedia content may be stored on the rendering device, the STB or at the local storage available to the STB/rendering device so that the user may access the multimedia content in the cloud using the pointer. In one embodiment, prior to providing the multimedia content, the user may be authenticated at the media source (i.e. service) to ensure that the user is authorized to access specific options within the media source (i.e. service) based on the user's subscription.

Referring back to FIG. 2, upon detecting a selection of multimedia content at the rendering device, the application at the rendering device alerts a media server 110 about the selection of the multimedia content at the rendering device, as illustrated by bubble 2. Along with the alert, the application may pass on the access information, such as time of request, location of the rendering device and a specific service that was used to request the multimedia content, etc. As mentioned earlier, the service may include cable TV service, digital TV service, satellite service or internet service. The media server 110 forwards the access information received from the rendering device to a media source so as to obtain schedule information related to the multimedia content. In one embodiment, the media source may be a program guide media source that accumulates information related to various programs scheduled for different locations, times and services from a plurality of media sources and organizes the information. The access information provides exactly what information the media server is requesting and the media source generates a subset of available multimedia content (for e.g., list A) based on the time, location and service information provided within the access information and forwards the information related to the subset to the media server for onward transmission to a media identification logic 120, as illustrated by bubble 3.

In addition to providing the access information, the application at the rendering device obtains audio signal for the selected multimedia content and forwards the audio signal to the media identification logic 120 for analysis to identify the multimedia content selected for rendering, as illustrated by bubble 4. The media identification logic 120 may be integrated within the media server 110, as illustrated in FIG. 1, or may be separate but interact with the media server, as illustrated in FIG. 2. The audio signal received by the media identification logic 120 is partitioned into a plurality of segments of audio snippets and a specific audio snippet is analyzed to identify acoustic modulation and to obtain audio fingerprint. The audio fingerprint is compared against the audio fingerprints of the subset of the multimedia content obtained for the scheduled time from the media source to find a multimedia content that matches the audio fingerprint of the snippet, as illustrated by bubble 5. It is faster and easier to find a match for the multimedia content selected for rendering at the rendering device using the small sub-set of the multimedia content as the selected multimedia content must be part of the programs that are scheduled for the specific time by the specific service.

Information related to the identified multimedia content is forwarded to the program-being-watched module within the media server, as illustrated by bubble 6. Upon obtaining the identity of the multimedia content, the media server then queries a media source in order to obtain information, such as current status, related to the identified multimedia content, as illustrated by bubble 7. The media source, in response to the query, provides current status defining the current context of the multimedia content as well as information related to any specific event that was triggered during rendering of the multimedia content and forwards the information to the media server. The media server may accumulate the status of the multimedia content leading up to the point of the current rendering so that the media server will be able to determine the current context of the multimedia content in relation to the previous contexts. The information related to the current status along with any event related information is forwarded to an events trigger module 121, as illustrated by bubble 8. The events trigger 121 interacts with an administrator module 122 to determine if the current multimedia content is part of the service programs for which the administrator module 122 has configured event triggers. As shown in FIG. 2, the administrator module 122 has configured event triggers for football, baseball, Oscars, Presidential debate, etc. Thus, if the selected multimedia content is for any of the serviced programs, the administrator module will identify the trigger events configured for the multimedia content. Otherwise, the administrator module 122 will have no information to provide.

For example, if the multimedia content that is rendering at the rendering device is related to football game, then the events trigger 121 determines football is part of the service programs defined by the administrator module 122 for which trigger events have been defined. The events trigger module 121 searches the configured events to see if the trigger event identified in the multimedia content is one of the events that is configured by the administrator module. For example, in the above football game example, the events trigger 121 determines whether there is an events trigger configured for approaching the red zone based on the event of a first team approaching a red zone. If there is an events trigger configured for approaching the red zone, then the administrator module provides the trigger event information, which includes the trigger event detail along with the media wrapper and user interface information to the events trigger 121. The events trigger 121 forwards the information received from the administrator module 122 for the event, to the media server 110. The media server 110 queries one or more media sources to obtain data facts associated with the identified specific event (for e.g., the first team approaching the red zone) in the current context, as illustrated by bubble 9. The various media sources identify, gather and forward the gathered data facts related to the specific event to a post-data-to-RD module in the media server 110, as illustrated by bubble 10. The post-data-to-RD module gathers information related to the specific triggered event from various media sources, uses the media wrapper and user interface information to organize the triggered event related data and forwards the organized information to the rendering device for rendering, as illustrated by bubble 11. The organized information may be stored in a content/tag repository along with the multimedia content, as video offsets at appropriate locations of the multimedia content or may be stored separately from the multimedia content, as tags. In the latter case, the content/tag repository may store multimedia content identifier along with various tag identifiers defining the video offsets. The content/tag repository may be used to query and obtain the additional information for the various events during replay of the multimedia content, if the multimedia content was pre-recorded using an STB. Thus, the additional information that is gathered for rendering is for streaming multimedia content that includes both live broadcast and re-broadcast of the multimedia content (i.e. rendering of pre-recorded multimedia content). In the case of live broadcast, the additional information is based on accumulated status up to the point in time when a trigger event occurs. In the case of re-broadcast, the additional information includes data from the live broadcast up to the point in time of the re-broadcast, providing a broader depth of the multimedia content for a user.

The various embodiments discussed herein bring together a data stream and video stream to provide additional rich content for the multimedia content at specific event triggers. For instance, in one embodiment that deals with sports data, the media server maps the play-by-play sports data leading up to the current context of the multimedia content and collects the additional information on-the-fly for specific events based on the accumulated status leading up to the current context so as to be able to present the appropriate context relevant and content rich information when specific event triggers occur. Although the current embodiment is related to sports data, the same concept can be extended to other type of multimedia content.

Figure 3A:
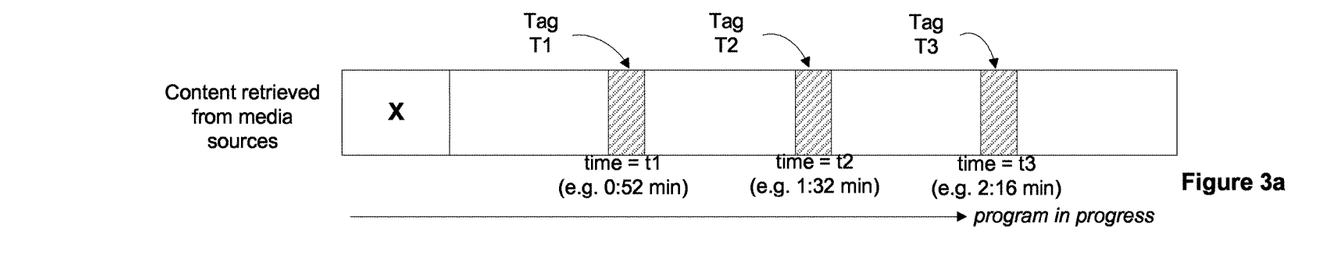
FIGS. 3a-3c illustrate exemplary temporal progress of multimedia content rendered on rendering devices, in various embodiments of the invention.

The information obtained from plurality of media sources may include factual data and display data. In one embodiment, the factual data may include statistical data related to a trigger event at the multimedia content and the display data may include generic information related to the team, such as team color, team logo, team name, etc. FIG. 3a illustrates sample video offsets identified by tags that are available for the game play during different times of the show, based on the event triggers specified for the show being watched. As illustrated, there are at least three video offsets defined by tags for the show at different time periods—tag T1 at time t1 defined at a 52 minute marker in the show, tag T2 at time t2 defined at the 1 hour and 32 minute marker in the show and tag T3 at time t3 defined at about the 2 hour and 16 minute marker in the show. The tags may be for the same event trigger or may be for different event triggers. Statistical and other pertinent data related to the event triggers are obtained from media sources and tagged to the three tags, T1, T2 and T3, and stored in a storage device for future rendering. Future rendering may include recording the aired show on a DVR or other storage device and presenting the show when the user selects the show at a later time.

It should be appreciated that presenting this information during the game, while the event is happening, provides real-time contextual information that is most relevant to a user watching the selected event. The user may be presented with an interface or option to select for viewing the additional data that is available for the particular event. In one embodiment, an indicator, such as an icon, text message, a plus sign or any other form of indicia, can be provided on the display device to visually indicate to the user that the media server 110 can provide additional information that is contextually related to an event that is being viewed. If the user chooses to view that information, a side window, a pop-up, a secondary window, or other display means can be provided alongside the live presentation of the selected event program (e.g. football game).

Figure 4A:
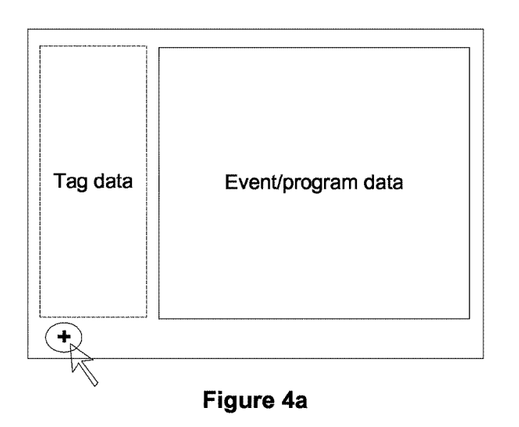
FIGS. 4a-4c illustrate exemplary screen shots identifying different locations and forms for rendering tagged factual data related to multimedia content, in various embodiments of the invention.
Figure 4B:
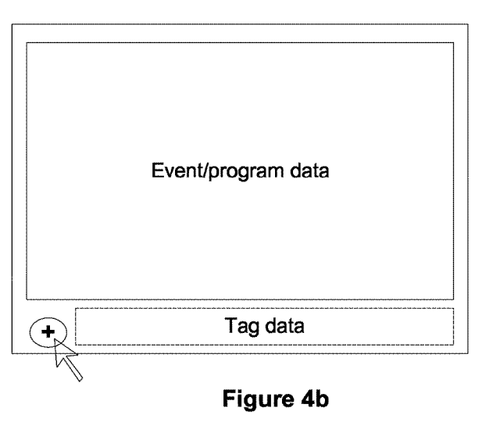
Figure 4C:
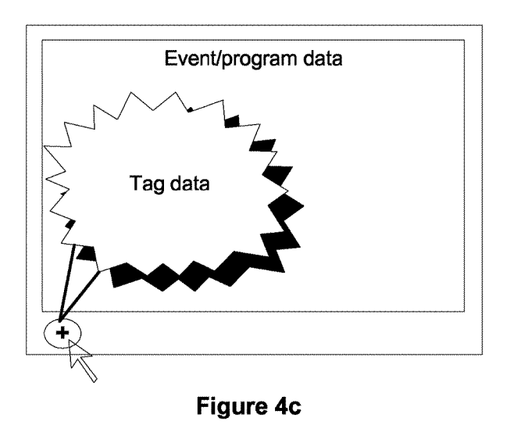

FIGS. 4a-4c illustrate some selective ways of rendering the additional information that is contextually related to what is being viewed on the rendering device. FIG. 4a illustrates a side window, FIG. 4b illustrates a bottom display window, and FIG. 4c illustrates a pop-up window on the rendering device. The above ways of rendering the additional information is exemplary and should not be considered restrictive. As a result, other ways of rendering the additional information may be employed including, but not limited to, rendering the additional data on a display device associated with an auxiliary device of the user.

Figure 3B:
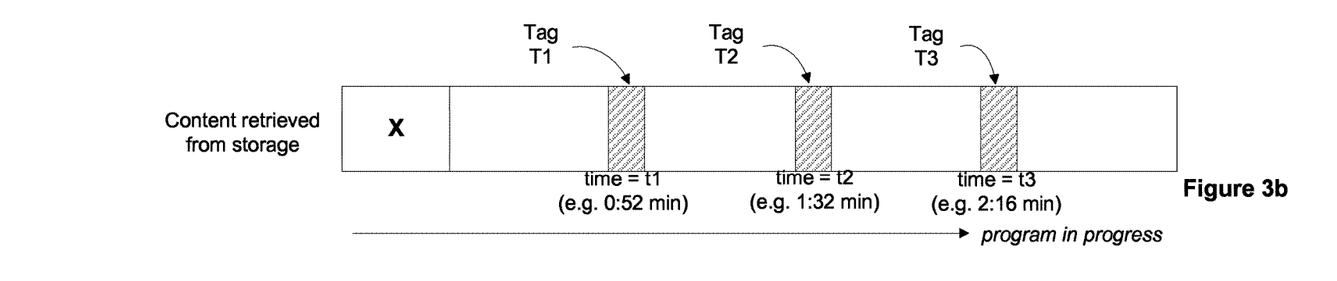

In another embodiment, the media server 110 can present previously aired/viewed show from a storage device, such as a DVR. In this embodiment, the media server may have already stored the show that was previously aired in a local storage based on user's request. In this embodiment, the show also includes specific events tags and relevant tagged data associated with the respective event tags based on event triggers specified by an administrator in relation to the context of the program. FIG. 3b illustrates the different tags that are available within the pre-recorded show, show X. When the user selects to view the previously recorded show, such as a game, the media server identifies the context of the game as the game progresses, detects any trigger events associated with the game and retrieves additional data that is contextually relevant to the context of the game based on the triggered events, from storage. The additional data from storage identifies what was collected during previous rendering of the show. In one embodiment, the additional data collected during previous rendering on a rendering device is stored in a repository, such as a tag repository 160 illustrated in FIG. 1. The additional data is provided as an option, such as an icon, on the rendering device while the user is watching the show. The user may select the option and the additional information is presented in a side window, bottom window, pop-up window or the like.

In yet another embodiment, the media server provides the user with an option to view additional data that was previously recorded as well as new data related to the pre-recorded show. In this embodiment, the media server determines the particular show that the user has selected from the local storage, retrieves additional data that is appropriate for the context of the show that the user is currently watching using time tags provided using the video offsets and presents the additional data to the user as and when trigger events occur. Additionally, the media server dynamically queries the media sources to obtain updated information for the specific event defined by the event trigger and present the newly obtained and updated information to the user along with the additional data retrieved from the local storage. For example, a user may have recorded the first game and not have watched the recorded show. The recorded game may have time-based data statistics and other additional information also recorded and stored with the recorded show. When the user wants to watch the first game at the end of the football season, the user will be presented with the statistics and other additional information recorded for specific trigger events that was gathered during the initial broadcast, which provides some information for the trigger event. In addition, the media server will also query the media sources and obtain latest information for the specific trigger event that occurred after the first game was aired and present the newly acquired information to the user when the user views the first game of the season. The newly acquired information may include information related to subsequent game plays, including the last game (if applicable), of the particular team featured in the first game.

Figure 3C:
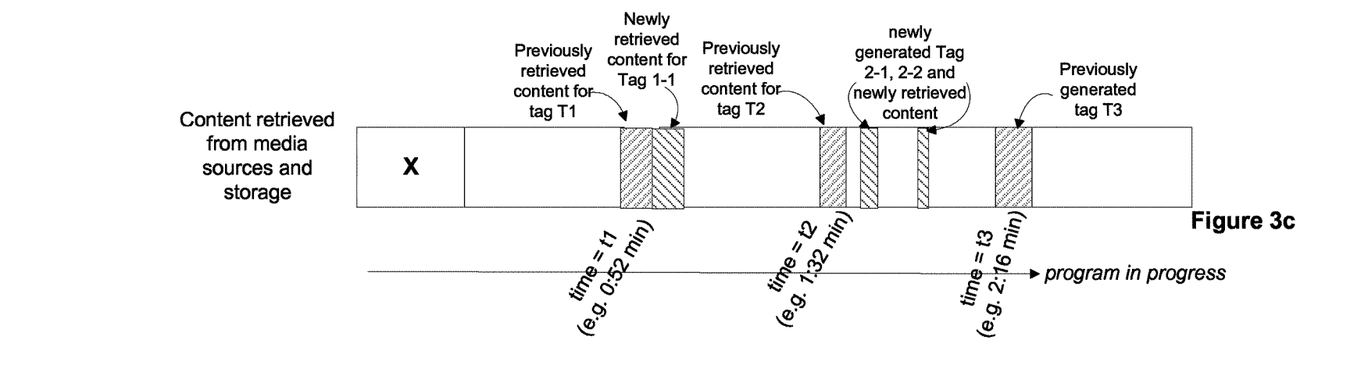

FIG. 3c illustrates a sample video snippet that identifies the different tags available at different time periods for which additional data is available for viewing, based on the trigger events and context of the show. As illustrated, in addition to tags T1, T2, T3 defined at times t1, t2, and t3 that was originally defined during the initial rendering of the game, additional tags, T1-1, T2-1, etc., may be defined at times t1, t2, etc., indicating additional data is available in addition to the event related data that was previously collected and retrieved from storage. In this embodiment, if the user watches the first game multiple times during the playoffs, the media server will query the media sources every time the user selects the first game, collects the additional data related to the trigger events defined in the game and presents the data to the user in the form of options. In one embodiment, each additional update may be provided as distinct options on the rendering device so that the user may select any one or all of the options to obtain updated information related to the trigger event. In an alternate embodiment, the newly acquired information and the additional information obtained from storage are consolidated and presented as a single option. Additionally, during the subsequent rendering, additional trigger events may be defined for which additional data may be obtained, as shown in FIG. 3c by newly generated tags T2-1, T2-2, for which content may be retrieved newly from the media sources and presented to the user as and when the events are triggered. Thus, the embodiments provide contextually relevant data for a multimedia content that is streaming live or is selected from storage for watching on the rendering device.

Figure 5:
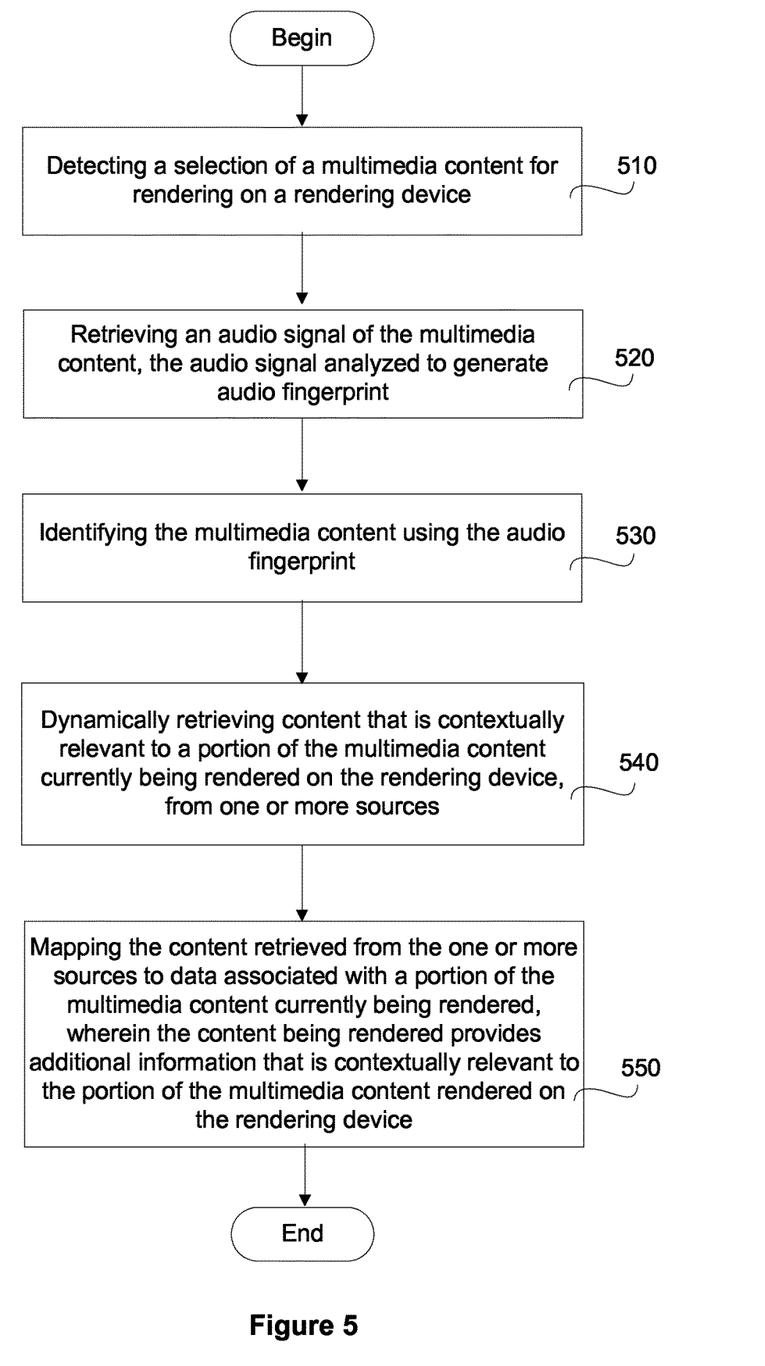
FIG. 5 illustrates a flow chart of operations used in providing contextually relevant information for a multimedia content streaming through a rendering device, in one embodiment of the invention.

With the above detailed description of the various embodiments, methods for managing data obtained from a plurality of sources and to provide contextually relevant information for multimedia content streaming through a rendering device will now be described with reference to FIGS. 5 and 6. FIG. 5 illustrates various process flow operations for managing data and providing contextually relevant information for multimedia content rendered on a rendering device, in one embodiment of the invention. The method begins at operation 510, wherein selection of a multimedia content for rendering, is detected. Audio signals of the selected multimedia content is retrieved and analyzed to generate an audio fingerprint, as illustrated in operation 520. In order to obtain the audio fingerprint, the audio signal is partitioned into a plurality of segments of small intervals. A particular segment is analyzed to identify acoustic modulations. The acoustic modulations are represented using a distinct vector of data points. The vector of the particular segment defines an audio fingerprint. The audio fingerprint is used for finding a match of a multimedia content from a content database or from a media source, as illustrated in operation 530.

Once the multimedia content selected for rendering on a rendering device is identified, one or more media sources are queried to identify and retrieve content that is contextually relevant to specific trigger events in the multimedia content, as illustrated in operation 540. The content retrieved from the media sources is mapped to a specific portion of the multimedia content that is currently being rendered on the rendering device, as illustrated in operation 550. The specific portion may include a trigger event and the content obtained from the media sources includes information that is contextually relevant to the trigger event. The mapping generates a video offset that causes the content to be rendered alongside the multimedia content when encountered. The content provides additional information for the triggered event.

Figure 6:
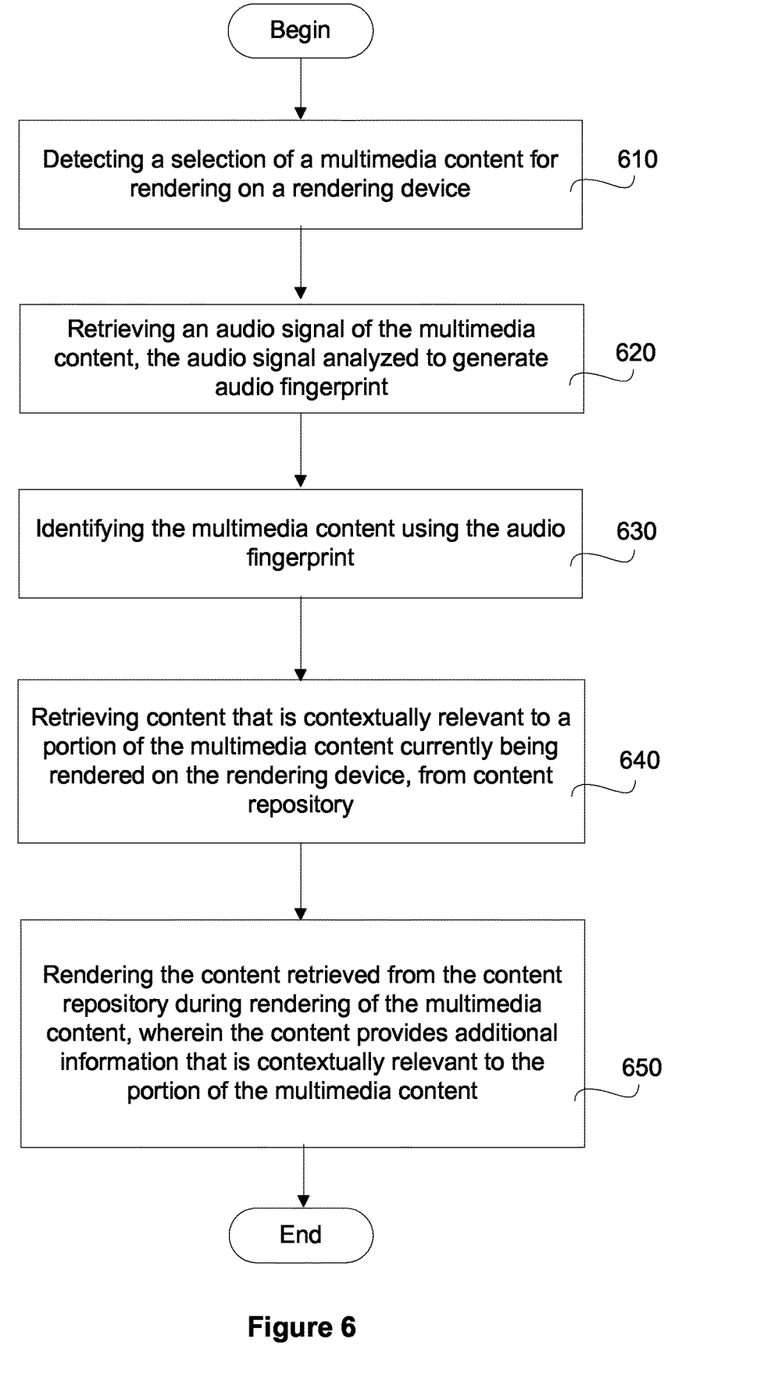
FIG. 6 illustrates a flow chart of operations used in providing contextually relevant information for a multimedia content streaming through a rendering device, in an alternate embodiment of the invention.

FIG. 6 illustrates another embodiment of a method for managing data from a plurality of sources and providing contextually relevant information for multimedia content streaming through a rendering device. The method begins with detection of a selection of the multimedia content for rendering on a rendering device, as illustrated in operation 610. The multimedia content is selected from a set of pre-recorded content available in a local storage associated with the rendering device. An audio signal of the multimedia content is retrieved and an audio fingerprint is generated, as illustrated in operation 620. The audio fingerprint is then used to identify in the multimedia content, as illustrated in operation 630. A content repository is queried and content that is contextually relevant to a portion of the multimedia content is identified and retrieved, as illustrated in operation 640. In one embodiment, a plurality of trigger events are defined based on the context of the multimedia content selected for rendering. The content repository includes content associated with various trigger events, which was collected from a plurality of sources for different portions of the multimedia content during prior rendering of the multimedia content. The retrieved content is presented for rendering on the rendering device alongside the multimedia content, as illustrated in operation 650. The retrieved content provides additional information that is contextually relevant to a specific portion of the multimedia content that is defined by a trigger event.

The embodiments of the invention thus provide an algorithm that can be executed by a processor on a media server to manage data obtained from a plurality of sources and to provide contextually relevant information for specific portions of a multimedia content selected for rendering on a rendering device. Specific points of interest are identified in the multimedia content based on the context and information content related to the specific points of interest are retrieved from storage or dynamically collected on-the-fly from media sources and presented to the user when the user is viewing the multimedia content at the specific points of interest. The relevant information presented to the users are up-to-date contextually relevant information irrespective of whether the multimedia content is time shifted or streaming live. The embodiments also provide the ability to add or update the information content collected during previous viewings so that the user is presented with the most updated information for the specific points of interest during subsequent viewing, thereby enhancing user's viewing experience. Other advantages of the algorithm may be easily envisioned by one skilled in the art.

It will be obvious, however, that the present invention may be practiced without some or all of these specific details. In other instances, well known process operations have not been described in detail in order not to unnecessarily obscure the present invention.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing contextually relevant information for multimedia content received at a rendering device, comprising:

detecting a selection of the multimedia content for rendering on the rendering device;

retrieving an audio signal of the multimedia content, the audio signal of a particular segment of the multimedia content is analyzed to generate an audio fingerprint, wherein the audio fingerprint is defined by a vector of data points;

identifying the multimedia content by matching the vector defining the audio fingerprint of the particular segment with a corresponding vector of the multimedia content;

identifying a plurality of trigger events that are likely to occur within the currently rendering multimedia content by analyzing at least part of the multimedia content, the analyzing is based on accumulated status leading up to a current context of a portion of the multimedia content currently being rendered on the rendering device;

dynamically retrieving, in substantial real time, content that is contextually relevant to specific ones of the plurality of trigger events that are likely to occur, from one or more content sources; and mapping at least a portion of the content retrieved from the one or more sources to a specific portion of the multimedia content currently being rendered, the mapping causes the retrieved content to be provided for rendering when a particular one of the plurality of trigger events associated with the retrieved content occurs within the specific portion of the multimedia content, wherein the content retrieved from the one or more sources is additional information that is contextually relevant to the particular trigger event occurring in the specific portion of the multimedia content that is currently rendering on the rendering device, wherein method operations are performed by a processor.

2. The method of claim 1, wherein identifying the multimedia content further includes, analyzing the particular segment to identify acoustic modulations in the particular segment, the analysis generating the vector of data points for the particular segment based on the acoustic modulation, the vector defining the audio fingerprint that is unique for the particular segment of the audio signal; and querying a content database on a server using the vector of the particular segment of audio signal to obtain content information for multimedia content that matches the audio fingerprint of the particular segment, the content information obtained from a content provider provides details related to the multimedia content that matches the audio signal.

3. The method of claim 1, wherein mapping further includes providing a video offset at the specific portion of the multimedia content where the particular trigger event occurs based on context, wherein the video offset is defined by temporally tagging the specific portion of the multimedia content; and mapping the content retrieved from the one or more sources to the video offset at the specific portion of the multimedia content.

4. The method of claim 3, further includes storing the retrieved content from the one or more sources in a content repository for subsequent retrieval and rendering.

5. The method of claim 4, wherein the subsequent retrieval of content from the content repository further includes, determining age of the content stored in the content repository for the particular trigger event;

when the age of the content exceeds a pre-defined threshold value, automatically discarding the content from the content repository.

6. The method of claim 3, further includes, providing an indicator at the video offset for the content from the one or more sources, the indicator indicative of presence of additional contextually relevant information for the specific portion of the multimedia content.

7. The method of claim 3, wherein the trigger event is a predefined event for the multimedia content.

8. The method of claim 1, wherein when there is no content available from the one or more sources for the portion of the multimedia content, providing a default content for the portion of the multimedia content based on the context of the multimedia content.

9. The method of claim 1, further includes, detecting a switch in the multimedia content rendered on the rendering device;

automatically discarding content retrieved from the one or more sources and stored in a content repository for the multimedia content rendered on the rendering device; and dynamically retrieving content from the one or more sources for newly switched multimedia content based on context and audio fingerprint generated for the newly switched multimedia content.

10. A method for providing contextually relevant information for multimedia content received at a rendering device, comprising:

detecting a selection of the multimedia content for rendering on the rendering device, wherein the multimedia content selected is a pre-recorded content;

retrieving an audio signal of the multimedia content, the audio signal of a particular segment of the multimedia content is analyzed to generate an audio fingerprint, wherein the audio fingerprint is defined by a vector of data points;

identifying the multimedia content by matching the vector defining the audio fingerprint of the particular segment with a corresponding vector of the multimedia content;

identifying a plurality of trigger events that have occurred within the multimedia content currently rendering on the rendering device;

dynamically retrieving, in substantial real time, content that is contextually relevant to a specific portion of the identified multimedia content currently rendering on the rendering device, from a content repository, wherein the content repository includes content collected from a plurality of sources for the specific ones of the plurality of trigger events that have occurred within the specific portion of the multimedia content and at least a portion of the content mapped to the specific portion of the multimedia content corresponding to at least a particular one of the plurality of trigger events, the mapping performed based on analysis of at least part of the multimedia content, wherein the analysis identifies accumulated status leading up to a current context of the specific portion of the multimedia content currently rendered on the rendering device in which the particular trigger event occurred, the mapping of the retrieved content is performed in substantial real time based on the current context of the multimedia content so as to present recent content for the specific portion of the multimedia content; and providing the content retrieved from the content repository for rendering during the occurrence of the particular trigger event within the specific portion of the multimedia content, wherein the content retrieved from the content repository is additional information that is contextually relevant to the specific portion of the multimedia content that is currently rendered on the rendering device, wherein method operations are performed by a processor.

11. The method of claim 10, wherein identifying the multimedia content further includes, analyzing the particular segment to identify acoustic modulations in the particular segment, the analysis generating the vector of data points for the particular segment based on the acoustic modulation, the vector defining the audio fingerprint that is unique for the particular segment of the audio signal; and querying a content database on a server using the vector of the particular segment of audio signal to obtain content information for multimedia content that matches the audio fingerprint of the particular segment, the content information obtained from a content provider provides details related to the multimedia content matching the audio signal.

12. The method of claim 10, wherein mapping further includes, identifying the particular trigger event using a video offset defined by a temporal tag at the specific portion of the multimedia content that is currently rendered on the rendering device; and retrieving the content mapped to the specific portion of the multimedia content from the content repository based on the video offset.

13. The method of claim 12, further includes, dynamically retrieving additional content related to the particular trigger event from one or more sources;

adding the additional content to the content retrieved for the particular trigger event from the content repository to generate composite content; and rendering the composite content on the rendering device during the rendering of the specific portion of the multimedia content in which the particular trigger event occurs, the composite content providing updated information related to the particular trigger event at the specific portion of the multimedia content.

14. The method of claim 10, wherein retrieving content from the content repository further includes, analyzing the content to determine age of the content;

when the age of the content exceeds a pre-defined threshold value, updating the content associated with the specific portion of the multimedia content in the content repository, the content for updating retrieved from the one or more sources based on the context of the multimedia content, the age of the content in the content repository is updated to reflect time of the update.

15. The method of claim 10, wherein the content retrieved from the plurality of sources includes any one or combination of video, audio, image, or promotional media related to the particular trigger event.

16. A method for providing contextually relevant information for multimedia content received at a rendering device, comprising:

detecting a selection of the multimedia content for rendering on the rendering device, the multimedia content selected is a pre-recorded content;

retrieving an audio signal of the multimedia content, the audio signal of a particular segment of the multimedia content is analyzed to generate an audio fingerprint, wherein the audio fingerprint is defined by a vector of data points;

identifying the multimedia content using the audio fingerprint, the multimedia content identified by matching the vector for the particular segment with a corresponding vector of the multimedia content;

identifying a plurality of trigger events that have occurred within the multimedia content currently rendering on the rendering device;

retrieving, in substantial real time, content that is contextually relevant to specific portions of the identified multimedia content currently being rendered on the rendering device, from a content repository and dynamically from one or more sources, wherein the content repository includes content collected from a plurality of sources for the specific ones of the plurality of trigger events that have occurred during prior rendering of the multimedia content and at least a portion of the content retrieved from the content repository is mapped to a specific portion of the multimedia content corresponding to at least a particular one of the plurality of trigger events, the mapping based on analysis of at least part of the multimedia content, the analysis identifying accumulated status leading up to a current context of the specific portion of the multimedia content currently being rendered in which the particular trigger event occurred, the mapping of the retrieved content is performed in substantial real time based on the current context of the multimedia content so as to present recent content for the specific portion of the multimedia content; and providing the retrieved content for rendering during current rendition of the specific portion of the multimedia content in which the particular trigger event occurs, wherein the retrieved content is additional information that is contextually relevant to the particular trigger event occurring in the specific portion of the multimedia content that is currently rendering on the rendering device, wherein method operations are performed by a processor.

17. The method of claim 16, further includes, mapping the dynamically retrieved content from the one or more sources to data associated with the particular trigger event occurring within the specific portion of the multimedia content currently rendering on the rendering device, the mapping results in updating the content stored in the content repository for the particular trigger event occurring within the portion of the multimedia content with the retrieved content.

* * * * *